US011306787B2

(12) United States Patent
Lin

(10) Patent No.: US 11,306,787 B2
(45) Date of Patent: Apr. 19, 2022

(54) MECHANICAL MULTI-ROD DISC BRAKE

(71) Applicant: Liang Wei Lin, Changhu (TW)

(72) Inventor: Liang Wei Lin, Changhu (TW)

(73) Assignee: Chang Hui Lin, Changhu (TW)

( * ) Notice: Subject to any disclaimer, the term of this patent is extended or adjusted under 35 U.S.C. 154(b) by 224 days.

(21) Appl. No.: 16/831,848

(22) Filed: Mar. 27, 2020

(65) Prior Publication Data

US 2021/0301890 A1 Sep. 30, 2021

(51) Int. Cl.
*F16D 65/18* (2006.01)
*F16D 55/228* (2006.01)
*F16D 65/00* (2006.01)
*F16D 65/46* (2006.01)
*F16D 55/00* (2006.01)
*F16D 125/60* (2012.01)

(52) U.S. Cl.
CPC ....... *F16D 55/228* (2013.01); *F16D 65/0081* (2013.01); *F16D 65/18* (2013.01); *F16D 65/46* (2013.01); *F16D 2055/0037* (2013.01); *F16D 2125/60* (2013.01)

(58) Field of Classification Search
CPC ......... F16D 55/228; F16D 65/18; F16D 65/46
USPC ........... 188/71.7, 71.8, 72.9, 74–76, 78, 342
See application file for complete search history.

(56) References Cited

U.S. PATENT DOCUMENTS

| 6,666,304 | B1* | 12/2003 | Huang | B60T 11/046 188/24.19 |
| 11,173,881 | B2* | 11/2021 | Kasuga | F16D 65/18 |
| 2012/0305343 | A1* | 12/2012 | Ebner | F16D 55/2245 188/71.8 |
| 2016/0167682 | A1* | 6/2016 | Asano | B61H 5/00 188/71.7 |
| 2017/0191534 | A1* | 7/2017 | Kawakami | F16D 55/225 |

* cited by examiner

*Primary Examiner* — Christopher P Schwartz
(74) *Attorney, Agent, or Firm* — Karin L. Williams; Mayer & Williams PC

(57) ABSTRACT

A mechanical multi-rod disc brake contains: a braking unit including an engagement structure having two bases, two swing arms, two wear-resistant sleeves, and two fixing pistons between which an accommodation space is defined so as to accommodate a stop disc. A respective one wear-resistant sleeve has a respective one fixing piston. A drive unit includes a multi-rod structure, and a respective one rotary shaft is rotatably connected with a respective one driven bolt rotatably connected with a respective one driving member via a respective one connection portion. A respective one joining element has a receiving hole rotatably connected with of a first extension of a first connection stein or a second extension of a second connection stein. Each of the first extension and the second extension has a resilient element, and the first and second extensions are connected with a brake cable via the first and second apertures.

4 Claims, 6 Drawing Sheets

US 11,306,787 B2

MECHANICAL MULTI-ROD DISC BRAKE

FIELD OF THE INVENTION

The present invention relates to a mechanical multi-rod disc brake which brakes the bicycle easily.

BACKGROUND OF THE INVENTION

A conventional brake shoe of a bicycle is applied to clamp a front wheel or a rear wheel, but a stopping force of a brake system of the bicycle cannot be erected on two clamp arms of an engagement structure evenly, thus making noises and damaging the brake shoes.

To overcome above-mentioned problem, an engagement structure of a disc brake is disclosed in TW Utility Model No. M466835 and contains two pads on which two arcuate recesses are defined respectively, two feet extending from bottoms of the two pads respectively. When two screw bolts are inserted through the two pads and to fix the engagement structure on a front fork of the bicycle, the two feet are inserted into two oval orifices of the engagement structure, and two arcuate protrusions of the two screw bolts abut against the two arcuate recesses of the two pads respectively, wherein the two feet are configured to avoid rotation of two washers with respect to the two oval orifices. However, it is exertive to stop the bicycle.

The present invention has arisen to mitigate and/or obviate the afore-described disadvantages.

SUMMARY OF THE INVENTION

The primary objective of the present invention is to provide a mechanical multi-rod disc brake by which the brake cable actuates the four driving members of the multi-rod structure so that the four driving members drive the two symmetrical swing arms of the braking unit to swing, and the two symmetrical fixing pistons are driven by the two symmetrical swing arms to brake the stop disc, thus braking the bicycle easily.

To obtain above-mentioned objective, a mechanical multi-rod disc brake provided by the present invention contains a braking unit including an engagement structure having two symmetrical bases, two symmetrical swing arms, two symmetrical wear-resistant sleeves, and two symmetrical fixing pistons between which an accommodation space is defined so as to accommodate a stop disc.

An end of a respective one of the two symmetrical bases is rotatably connected with a support column of a respective one of the two symmetrical swing arms, and the respective one base accommodates a respective one of the two symmetrical wear-resistant sleeves, wherein the respective one wear-resistant sleeve has a respective one of the two symmetrical fixing pistons moving therein, a first end of the respective one swing arm is rotatably connected with the respective one fixing piston by a respective one of two locking bolts so as to drive the respective one fixing piston to move reciprocately in the respective one wear-resistant sleeve, and a second end of the respective one swing arm is rotatably connected with a respective one of two symmetrical rotary shafts.

A drive unit includes a multi-rod structure mounted on the respective one rotary shaft, and the respective one rotary shaft is rotatably connected with a respective one of two driven bolts, the respective one driven bolt is rotatably connected with a respective one of four driving members via a respective one of four connection portions, such that the respective one swing arm drives the respective one driving member to swing via the respective one rotary shaft.

A respective one of two joining elements is rotatably connected with the respective one driving member, and the respective one joining element has a receiving hole defined on a middle section thereof and is rotatably connected with of a first extension of a first connection stein or a second extension of a second connection stein, wherein each of the first extension and the second extension has a resilient element fitted on a distal end thereof, the first extension is inserted through a first aperture to connect with a brake cable by using and the second extension is inserted through a second aperture to connect with the brake cable;

Thereby, when the brake cable actuates the four driving members of the multi-rod structure, the four driving members drive the two symmetrical swing arms of the braking unit to swing, and the two symmetrical fixing pistons are driven by the two symmetrical swing arms to brake the stop disc.

DETAILED DESCRIPTION OF THE PREFERRED EMBODIMENTS

Figure 1:
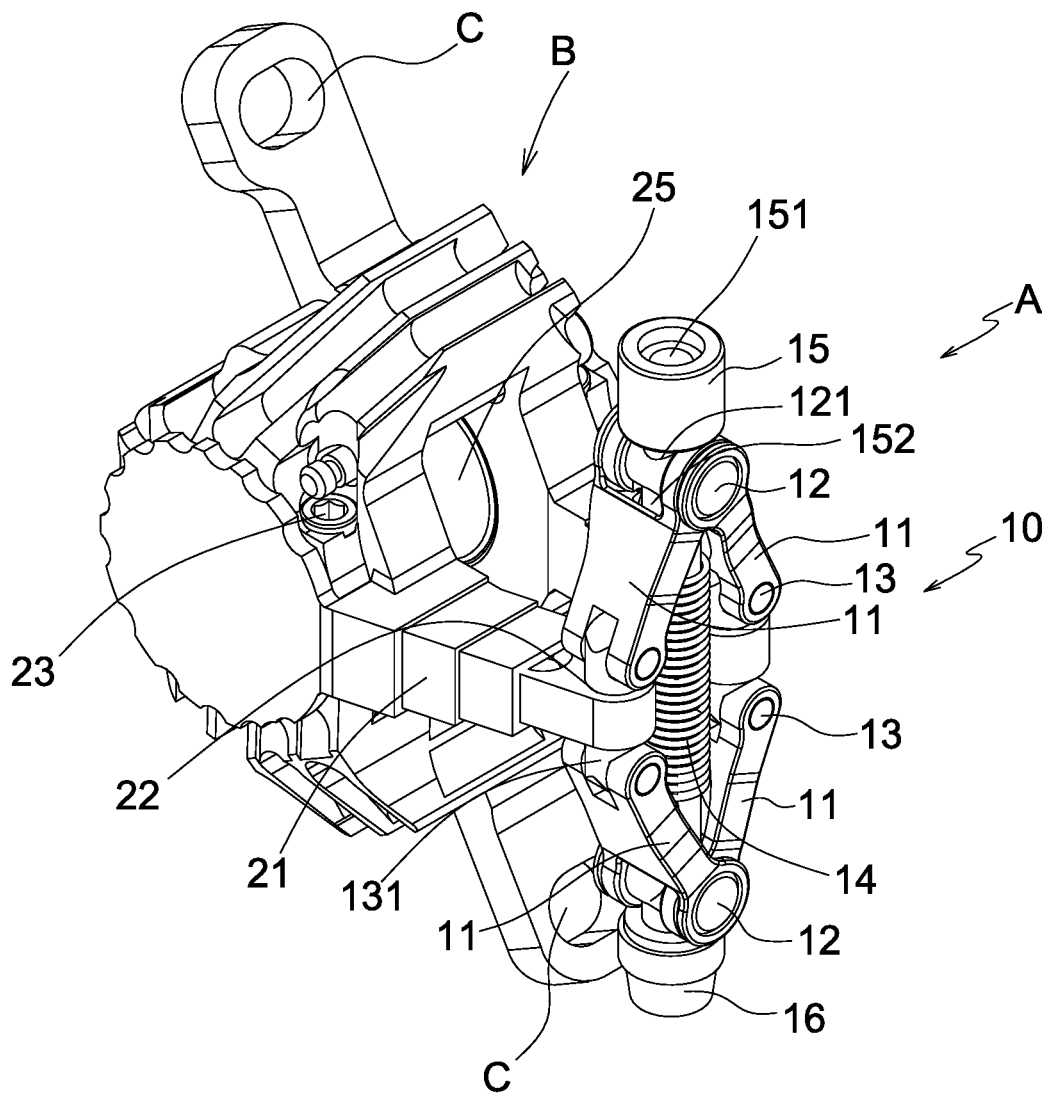
FIG. 1 is a perspective view showing the assembly of a mechanical multi-rod disc brake according to a preferred embodiment of the present invention.
Figure 2:
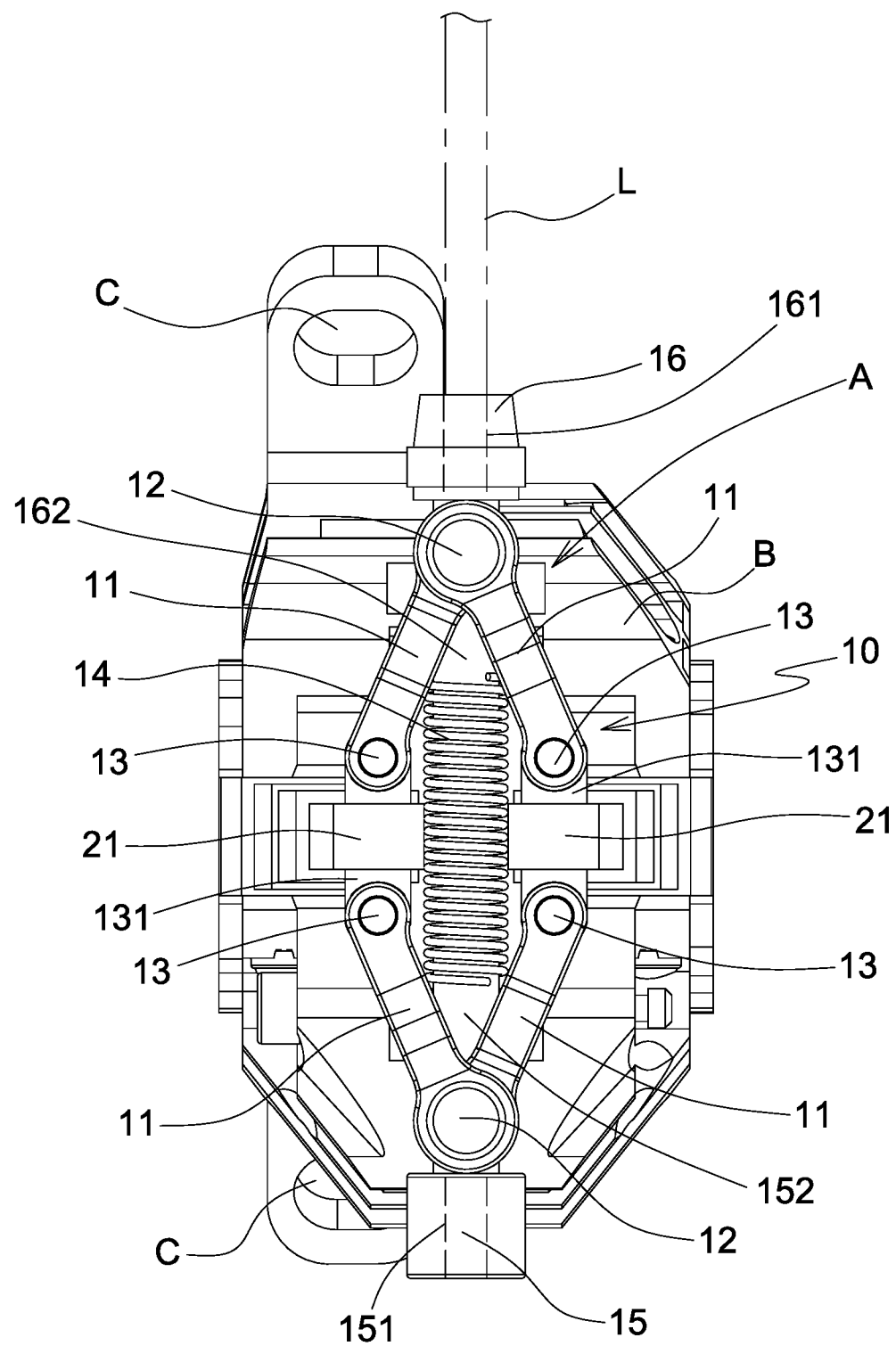
FIG. 2 is a side plan view showing the assembly of the mechanical multi-rod disc brake according to the preferred embodiment of the present invention.
Figure 3:
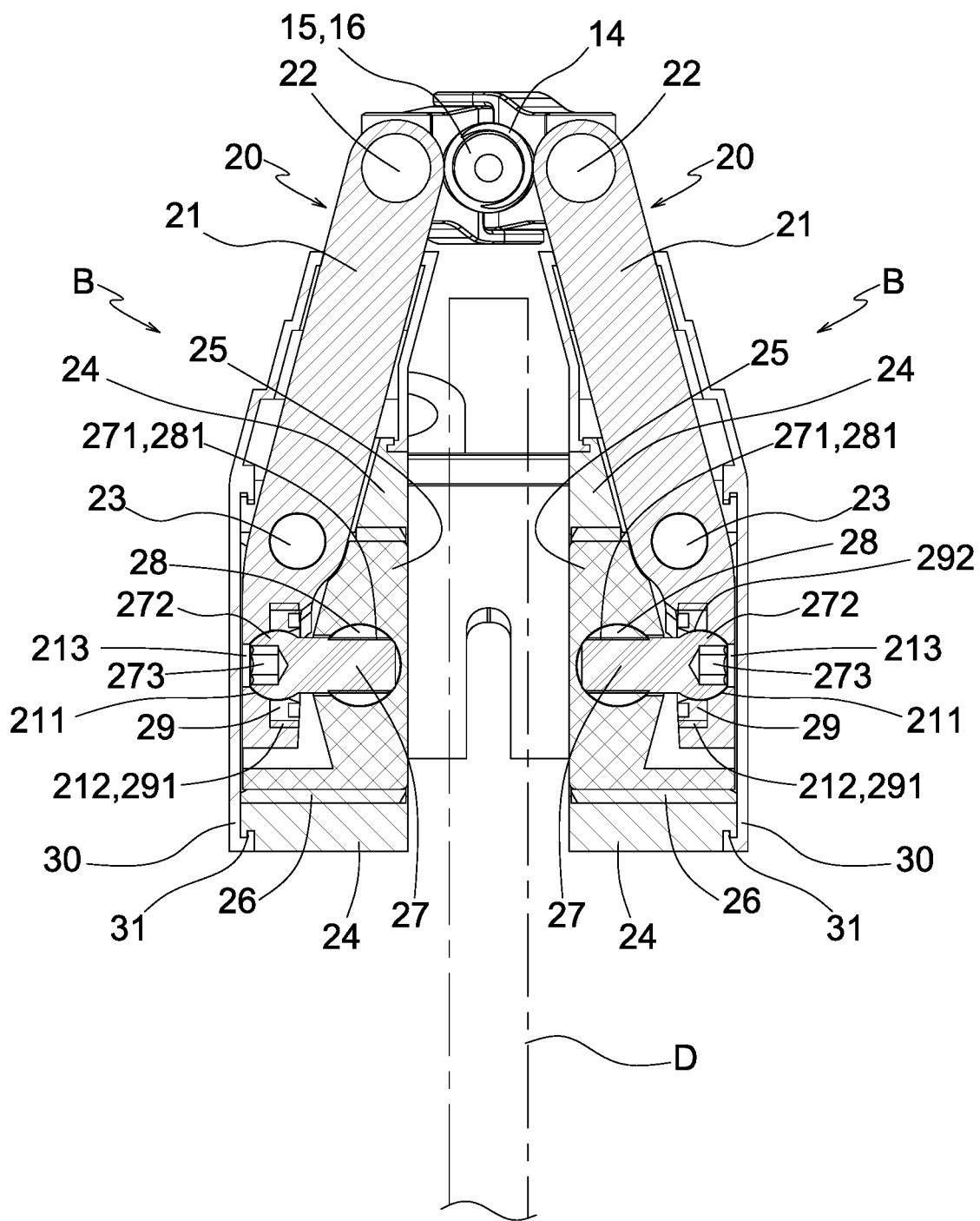
FIG. 3 is a cross sectional view showing the assembly of the mechanical multi-rod disc brake according to the preferred embodiment of the present invention.
Figure 4:
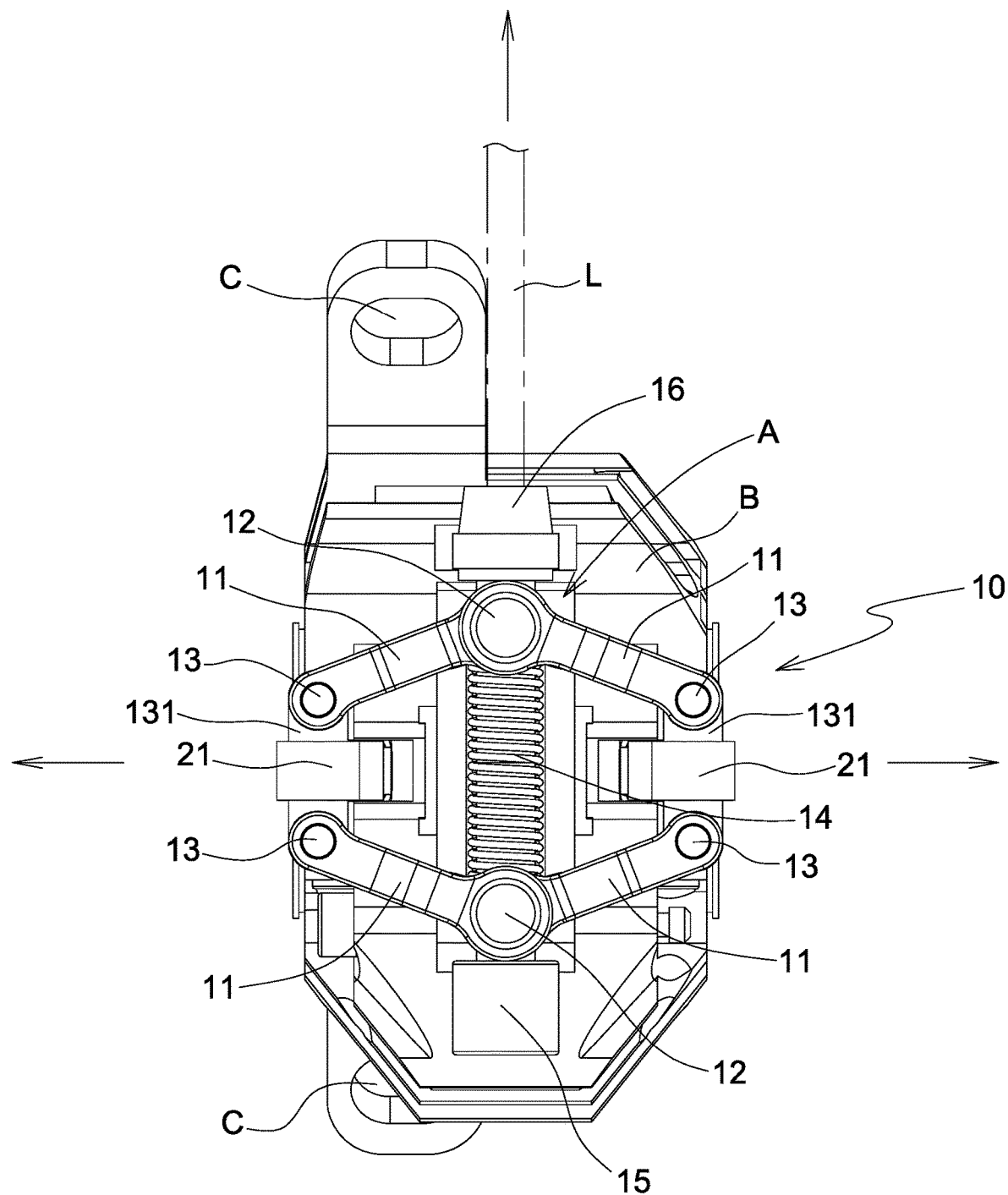
FIG. 4 is a side plan view showing the operation of the mechanical multi-rod disc brake according to the preferred embodiment of the present invention.
Figure 5:
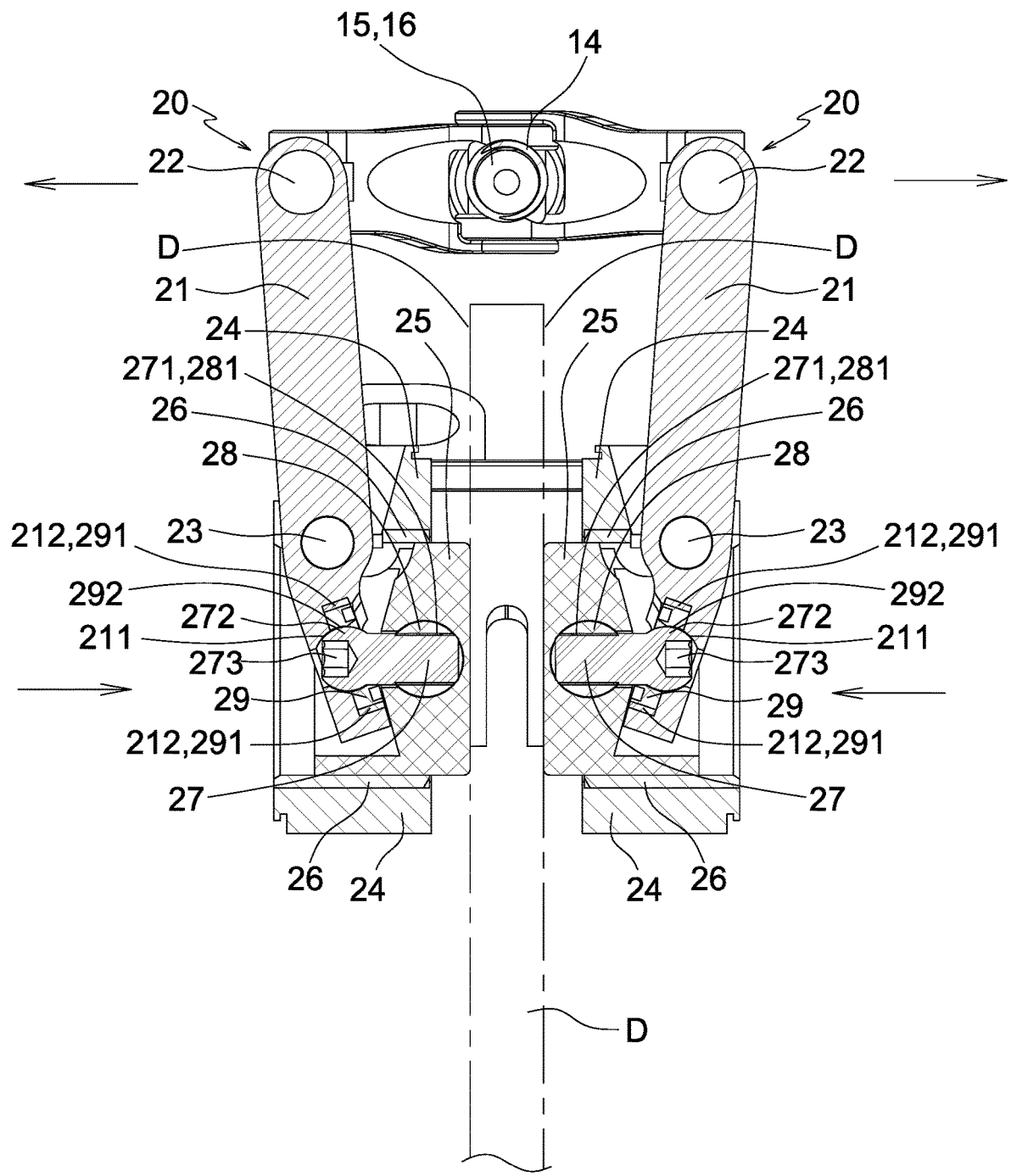
FIG. 5 is a cross sectional view showing the operation of the mechanical multi-rod disc brake according to the preferred embodiment of the present invention.
Figure 6:
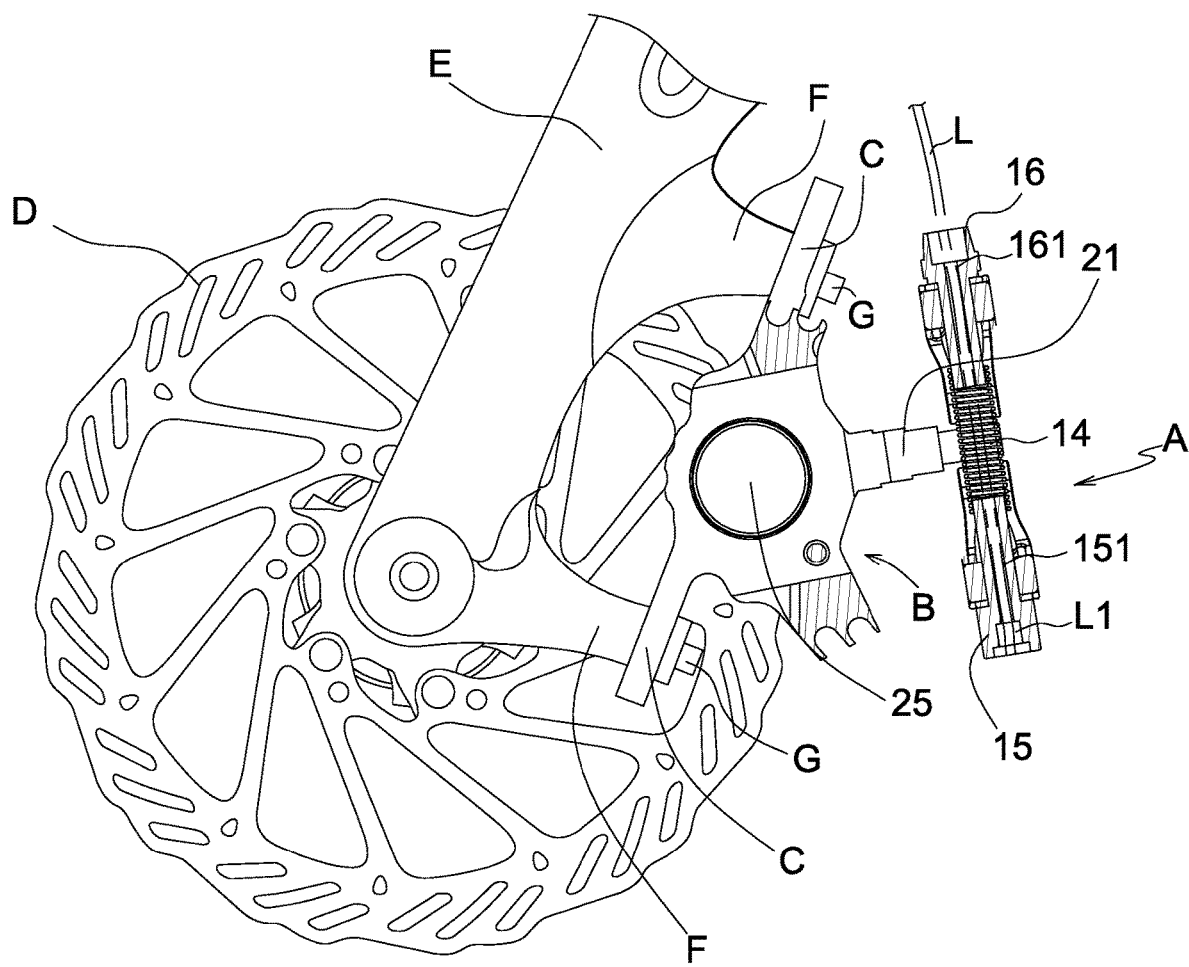
FIG. 6 is a perspective view showing the application of the mechanical multi-rod disc brake according to the preferred embodiment of the present invention.

With reference to FIGS. 1-6, a mechanical multi-rod disc brake according to a preferred embodiment of the present invention comprises:

a braking unit B including an engagement structure 20 having two symmetrical bases 24, two symmetrical swing arms 21, two symmetrical wear-resistant sleeves 26, and two symmetrical fixing pistons 25 between which an accommodation space is defined so as to accommodate a stop disc D;

wherein an end of a respective one of the two symmetrical bases 24 is rotatably connected with a support column 23 of a respective one of the two symmetrical swing arms 21, and the respective one base 24 accommodates a respective one of the two symmetrical wear-resistant sleeves 26, wherein the respective one wear-resistant sleeve 26 has a respective one of the two symmetrical fixing pistons moving therein, a first end of the respective one swing arm 21 is rotatably connected with the respective one fixing piston 25 by a respective one of two locking bolts 27 so as to drive the respective one fixing piston 25 to move reciprocately in the respective one wear-resistant sleeve 26, and a second end of the respective one swing arm 21 is rotatably connected with a respective one of two symmetrical rotary shafts 22;

wherein a respective one of two locking orifices C extends on two sides of the respective one base 24 and is configured to lock with a coupling element G so as to fix a multi-rod structure 10 on a connection position F of a rear fork E of a bicycle;

wherein a drive unit A includes the multi-rod structure 10 mounted on the respective one rotary shaft 22, and the respective one rotary shaft 22 is rotatably connected with a respective one of two driven bolts 131, the respective one driven bolt 131 is rotatably connected with a respective one of four driving members 11 via a respective one of four connection portions 13, such that the respective one swing arm 21 drives the respective one driving member 11 to swing via the respective one rotary shaft 22, wherein a respective one of two joining elements 12 is rotatably connected with the respective one driving member 11, and the respective one joining element 12 has a receiving hole 121 defined on a middle section thereof and is rotatably connected with of a first extension 152 of a first connection stein 15 or a second extension 162 of a second connection stein 16, wherein each of the first extension 152 and the second extension 162 has a resilient element 14 fitted on a distal end thereof, the first extension 152 is inserted through a first aperture 151 to connect with a brake cable L by using and the second extension 162 is inserted through a second aperture 161 to connect with the brake cable L, then the brake cable L is fixed by a limitation element L1 so as to actuate the four driving members 11 of the multi-rod structure 10 to extend outward and retract back to an original position. When the brake cable L actuates the four driving members 11 of the multi-rod structure 10, the four driving members 11 drive the two symmetrical swing arms 21 of the braking unit B to swing, and the two symmetrical fixing pistons 25 are driven by the two symmetrical swing arms 21 to brake the stop disc D, thus braking the bicycle easily.

The respective one fixing piston 25 has an actuation knob 28 accommodated therein, and the actuation knob 28 has a threaded recess 281 defined on a side thereof so as to screw with outer threads 271 of the respective one locking bolt 27, wherein the respective one locking bolt 27 has a notch 273 formed on a first end thereof, and the respective one swing arm 21 has an opening 213 corresponding to the notch 273 of the respective one locking bolt 27, the respective one locking bolt 27 further has a movable knob 272 arranged on a second end thereof, and the respective one swing arm 21 has a spherical trench 211 rotatably connected with the movable knob 272 of the respective one locking bolt 27.

A screw nut 29 is configured to limit the movable knob 272 of the respective one locking bolt 27 with respect to the respective one swing arm 21, and the screw nut 29 has an indentation 292 corresponding to the movable knob 272, and the screw nut 29 has an external screwing section 291 formed on an outer wall thereof so as to correspond to an internal screwing section 212 of the respective one swing arm 21, such that the screw nut 29 is screwed with the internal screwing section 212 of the respective one swing arm 21 by ways of the external screwing section 291.

Preferably, the braking unit B is covered by a protective case 30 which includes a fastener 31 for engaging with the braking unit B.

Thereby, the brake cable L actuates the four driving members 11 of the multi-rod structure 10 so that the four driving members 11 drive the two symmetrical swing arms 21 of the braking unit B to swing, and the two symmetrical fixing pistons 25 are driven by the two symmetrical swing arms 21 to brake the stop disc D, thus braking the bicycle easily.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A mechanical multi-rod disc brake comprising:
   a braking unit including an engagement structure having two symmetrical bases, two symmetrical swing arms, two symmetrical wear-resistant sleeves, and two symmetrical fixing pistons between which an accommodation space is defined so as to accommodate a stop disc;
   wherein an end of a respective one of the two symmetrical bases is rotatably connected with a support column of a respective one of the two symmetrical swing arms, and the respective one base accommodates a respective one of the two symmetrical wear-resistant sleeves, wherein the respective one wear-resistant sleeve has a respective one of the two symmetrical fixing pistons moving therein, a first end of the respective one swing arm is rotatably connected with the respective one fixing piston by a respective one of two locking bolts so as to drive the respective one fixing piston to move reciprocately in the respective one wear-resistant sleeve, and a second end of the respective one swing arm is rotatably connected with a respective one of two symmetrical rotary shafts;
   wherein a drive unit includes a multi-rod structure mounted on the respective one rotary shaft, and the respective one rotary shaft is rotatably connected with a respective one of two driven bolts, the respective one driven bolt is rotatably connected with a respective one of four driving members via a respective one of four connection portions, such that the respective one swing arm drives the respective one driving member to swing via the respective one rotary shaft;
   wherein a respective one of two joining elements is rotatably connected with the respective one driving member, and the respective one joining element has a receiving hole defined on a middle section thereof and is rotatably connected with of a first extension of a first connection stein or a second extension of a second connection stein, wherein each of the first extension and the second extension has a resilient element fitted on a distal end thereof, the first extension is inserted through a first aperture to connect with a brake cable by using and the second extension is inserted through a second aperture to connect with the brake cable;
   wherein when the brake cable actuates the four driving members of the multi-rod structure, the four driving members drive the two symmetrical swing arms of the braking unit to swing, and the two symmetrical fixing pistons are driven by the two symmetrical swing arms to brake the stop disc.

2. The mechanical multi-rod disc brake as claimed in claim 1, wherein the respective one fixing piston has an actuation knob accommodated therein, and the actuation knob has a threaded recess defined on a side thereof so as to screw with outer threads of the respective one locking bolt, wherein the respective one locking bolt has a notch formed on a first end thereof, and the respective one swing arm has an opening corresponding to the notch of the respective one locking bolt, the respective one locking bolt further has a movable knob arranged on a second end thereof, and the respective one swing arm has a spherical trench rotatably connected with the movable knob of the respective one locking bolt.

3. The mechanical multi-rod disc brake as claimed in claim 2, wherein a screw nut is configured to limit the movable knob of the respective one locking bolt with respect to the respective one swing arm, and the screw nut has an indentation corresponding to the movable knob, and the screw nut has an external screwing section formed on an outer wall thereof so as to correspond to an internal screwing section of the respective one swing arm, such that the screw nut is screwed with the internal screwing section of the respective one swing arm by ways of the external screwing section.

4. The mechanical multi-rod disc brake as claimed in claim 1, wherein the braking unit is covered by a protective case which includes a fastener for engaging with the braking unit.

* * * * *